(12) United States Patent
Krantz et al.

(10) Patent No.: US 8,391,456 B2
(45) Date of Patent: Mar. 5, 2013

(54) DYNAMIC CONFIGURATION OF CALL CONTROLS FOR COMMUNICATION PERIPHERALS

(75) Inventors: Anton Krantz, Redmond, WA (US); Brian Meek, Redmond, WA (US); Mu Han, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 943 days.

(21) Appl. No.: 12/408,334

(22) Filed: Mar. 20, 2009

(65) Prior Publication Data

US 2010/0239081 A1 Sep. 23, 2010

(51) Int. Cl.
*H04M 3/42* (2006.01)
*H04W 4/00* (2009.01)

(52) U.S. Cl. ......... 379/207.02; 379/201.01; 379/201.04; 379/207.03; 379/207.04; 455/432.3

(58) Field of Classification Search ............. 379/207.02, 379/211.02, 201.01, 207.03, 207.04, 201.02, 379/201.05, 201.04; 455/415, 432.3, 414.1
See application file for complete search history.

(56) References Cited

U.S. PATENT DOCUMENTS

| 7,216,221 | B2 | 5/2007 | Bear et al. |
| 2008/0146265 | A1 | 6/2008 | Valavi |
| 2009/0180602 | A1* | 7/2009 | Ramanathan et al. ... 379/211.02 |
| 2009/0311999 | A1* | 12/2009 | Sarkar et al. .................. 455/415 |

OTHER PUBLICATIONS

"Bringing Smart Unified Communications to your Business", Retrieved at << http://209.85.229.132/search?q=cache:N1rEilYxCXcJ:www.lg-nortel.com:8140/ucdevices/data/LGN_UC_BROCHURE_R4_lores.pdf+Unified+Communication+USB+peripheral+call+context&cd=1&hl=en&ct=clnk >>, LG-Nortel IP8500 Series, Mar. 24, 2009, pp. 1-10.
Santeusanio, Peter, "Microsoft's Unified Communications Strategy and Office Communicator Enabled Devices", Retrieved at << http://www.ucstrategies.com/uploadedFiles/UC_Views/Industry_Buzz/Office%20Communicator%20Enabled%20Devices.pdf >>, Jan. 19, 2007, pp. 14.
"Nortel IP Telephones", Retrieved at << http://www.deltatelephone.com/convergence_nortel%20IP%20phones.html >>, DELTA Telephone, Cabling & Data Services, Mar. 24, 2009, pp. 7.
"Free VoIP Industry News", Retrieved at << http://www.eutecticsinc.com/news/news.html >>, Eutectics and NetGen Communications TMC Labs Innovation Award, Jun. 21, 2007, pp. 1-8.
"CTI Magazine's Buyers Guide Issue—CTI News", Retrieved at http://www.tmcnet.com/cti/bg/ctinews.htm >>, Mar. 24, 2009, pp. 1-11.
Hickey, Andrew R."Microsoft Unveils Unified Communications Devices", Retrieved at << http://searchunifiedcommunications.techtarget.com/news/article/0,289142,sid186_gci1255013,00.html# >>, Unified Communications News, May 15, 2007, pp. 1-3.
"Business Telephone Systems and Voice Applications", Retrieved at << http://www.goldstartelecom.ie/microsoft_office_communicator.html >>, GoldStar Telecom—Distributor of LG-Nortel Telephone Systems in Ireland, Jan. 20, 2009, pp. 1-4.

\* cited by examiner

*Primary Examiner* — Thjuan K Addy

(74) *Attorney, Agent, or Firm* — Turk IP Law, LLC

(57) ABSTRACT

Callers of an enhanced communication system are enabled to improve their communication experience by receiving context specific call controls on their peripheral device before, during, and/or after a call. A communication application determines context specific commands and configures/reconfigures call controls on the peripheral device. The peripheral device displays the call context specific controls in different stages of operation and forwards user selection(s) to the communication application without a need to understand the commands of perform actions associated with the commands.

14 Claims, 10 Drawing Sheets

DYNAMIC CONFIGURATION OF CALL CONTROLS FOR COMMUNICATION PERIPHERALS

BACKGROUND

As an alternative to Public Switched Telephone Network (PSTN) systems, a recent development is the wide spread use of Voice over IP (VOIP) telephony, which uses internet protocol over wired and wireless networks. With the availability of diverse types of communication networks and devices capable of taking advantage of various features of these networks, a new technology is bringing different communication networks together providing until now unavailable functionality such as combining various modes of communication (e.g. instant messaging, voice calls, video communications, etc.). This technology is referred to as unified communications (UC). A network of servers manages end devices capable of handling a wide range of functionality and communication while facilitating communications between the more modern unified communication network devices and other networks (e.g. PSTN, cellular, etc.).

One of the key value propositions of Unified Communications is enabling the use of the PC as a phone for real time communications (soft phone). A significant inhibitor to the successful adoption of the PC as a soft phone is the availability of a good quality PC audio peripheral, which is able to provide the functionality of the desk phone it replaces. A number of peripherals have been introduced, such as Universal Serial Bus (USB) devices. These peripherals provide the ability to control the call from the peripheral without needing to interact with the PC user interface, which may be locked and not readily visible to the user at the time of a call. Control commands are, however, currently limited to the number of buttons provided by the peripheral.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to enhanced communication systems and components enabling controls on a communication peripheral to be configured and reconfigured based on context of a call. Default controls on the communication peripheral may be configured/reconfigured to provide call context specific functionality to callers prior to, during, or after the call eliminating a need to update software or hardware aspects of peripheral devices as new call control features are added. For example, updates to the communication software may be performed without requiring updates to the peripheral firmware or new hardware.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Figure 1:
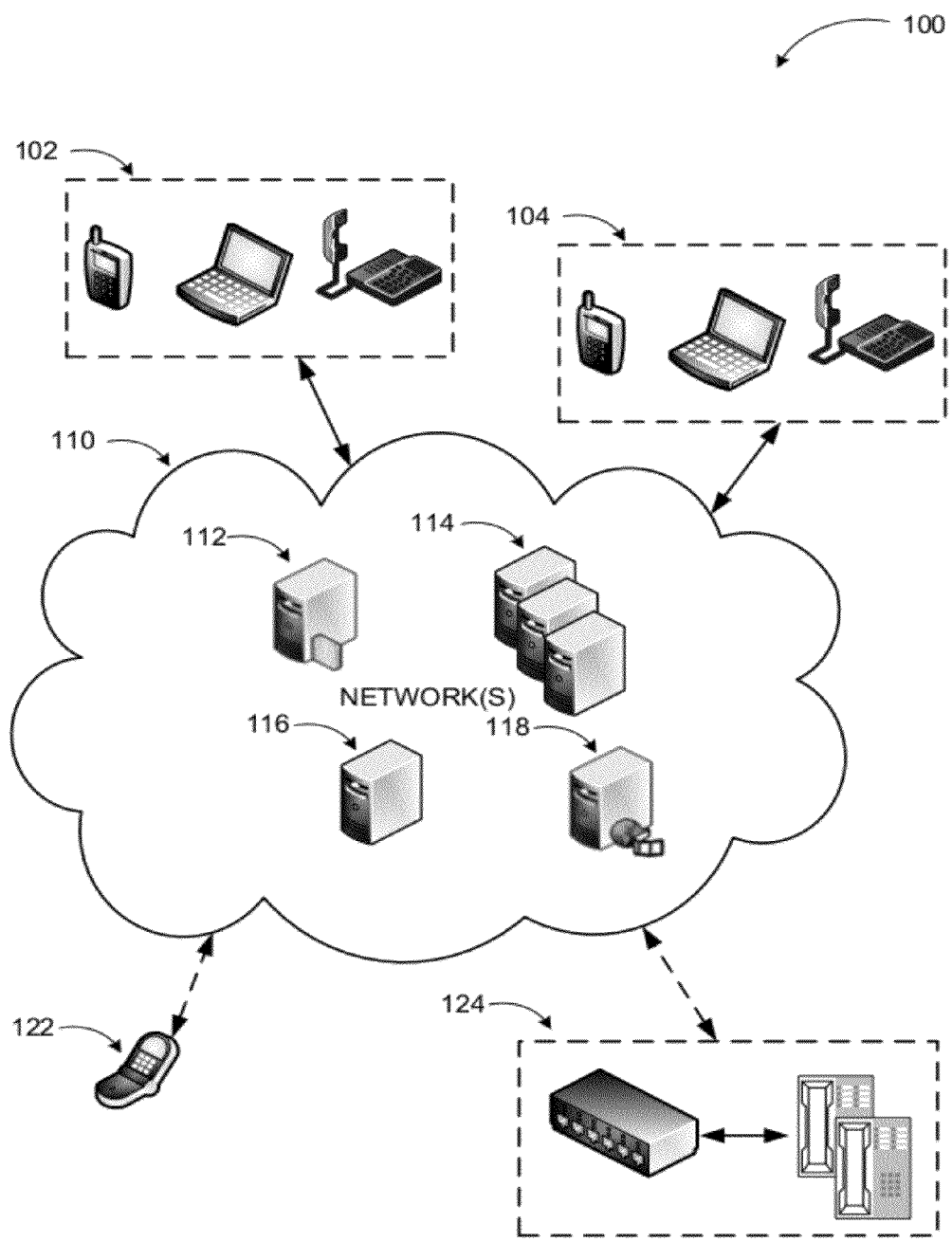
FIG. 1 is a diagram illustrating an example unified communications system.

As briefly discussed above, controls on the communication peripheral may be configure/reconfigured to provide context specific functionality to a caller during the call. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media. The computer program product may also be a propagated signal on a carrier (e.g. a frequency or phase modulated signal) or medium readable by a computing system and encoding a computer program of instructions for executing a computer process.

Throughout this specification, the term "platform" may be a combination of software and hardware components for use of call context specific controls with a communication peripheral in enhanced communication systems. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Referring to FIG. 1, diagram 100 of an example unified communications system is illustrated. As mentioned above, a unified communication system is a real-time communications system facilitating instant messaging, presence, audio-video conferencing, web conferencing, and similar functionality.

In a unified communication system such as the one shown in diagram 100, users may communicate via a variety of end devices (102, 104), which are client devices of the UC system. Each client device may be capable of executing one or more communication applications for voice communication, video communication, instant messaging, application sharing, data sharing, and the like. In addition to their advanced functionality, the end devices may also facilitate traditional phone calls through an external connection such as through PBX 124 to a Public Switched Telephone Network (PSTN). End devices may include any type of smart phone, cellular phone, any computing device executing a communication application, a smart automobile console, and advanced phone devices with additional functionality.

Unified Communication (UC) Network(s) 110 includes a number of servers performing different tasks. For example, UC servers 114 provide registration, presence, and routing functionalities. Presence functionality enables the system to route calls to a user to anyone of the client devices assigned to the user based on default and/or user set policies. For example, if the user is not available through a regular phone, the call may be forwarded to the user's cellular phone, and if that is not answering a number of voicemail options may be utilized. Since the end devices can handle additional communication modes, UC servers 114 may provide access to these additional communication modes (e.g. instant messaging, video communication, etc.) through access server 112. Access server 112 resides in a perimeter network and enables connectivity through UC network(s) 110 with other users in one of the additional communication modes. UC servers 114 may include servers that perform combinations of the above described functionalities or specialized servers that only provide a particular functionality. For example, home servers providing presence functionality, routing servers providing routing functionality, and so on. Similarly, access server 112 may provide multiple functionalities such as firewall protection and connectivity.

Audio/Video (A/V) conferencing server 118 provides audio and/or video conferencing capabilities by facilitating those over an internal or external network. Mediation server 116 mediates signaling and media to and from other types of networks such as a PSTN or a cellular network (e.g. calls through PBX 124 or from cellular phone 122). Mediation server 116 may also act as a Session Initiation Protocol (SIP) user agent.

In a UC system, users may have one or more identities, which is not necessarily limited to a phone number. The identity may take any form depending on the integrated networks, such as a telephone number, a Session Initiation Protocol (SIP) Uniform Resource Identifier (URI), or any other identifier. While any protocol may be used in a UC system, SIP is a preferred method.

The SIP is an application-layer control (signaling) protocol for creating, modifying, and terminating sessions with one or more participants. It can be used to create two-party, multi-party, or multicast sessions that include Internet telephone calls, multimedia distribution, and multimedia conferences. SIP is designed to be independent of the underlying transport layer.

SIP clients may use Transport Control Protocol ("TCP") to connect to SIP servers and other SIP endpoints. SIP is primarily used in setting up and tearing down voice or video calls. However, it can be used in any application where session initiation is a requirement. These include event subscription and notification, terminal mobility, and so on. Voice and/or video communications are typically done over separate session protocols, typically Real-time Transport Protocol ("RTP").

SIP is intended to provide a signaling and call setup protocol for IP-based communications that can support a superset of the call processing functions and features present in the PSTN. SIP by itself does not define these features, however. Rather, its focus is call-setup and signaling. SIP is also designed to enable the building of such features in network elements known as proxy servers and user agents. These are features that permit familiar telephone-like operations: dialing a number, causing a phone to ring, hearing ring back tones or a busy signal.

While the example systems are described with SIP features in following figures, many other Voice over IP (VoIP) protocols exist and embodiments may be implemented with any of those protocols using the principles described herein.

Figure 2:
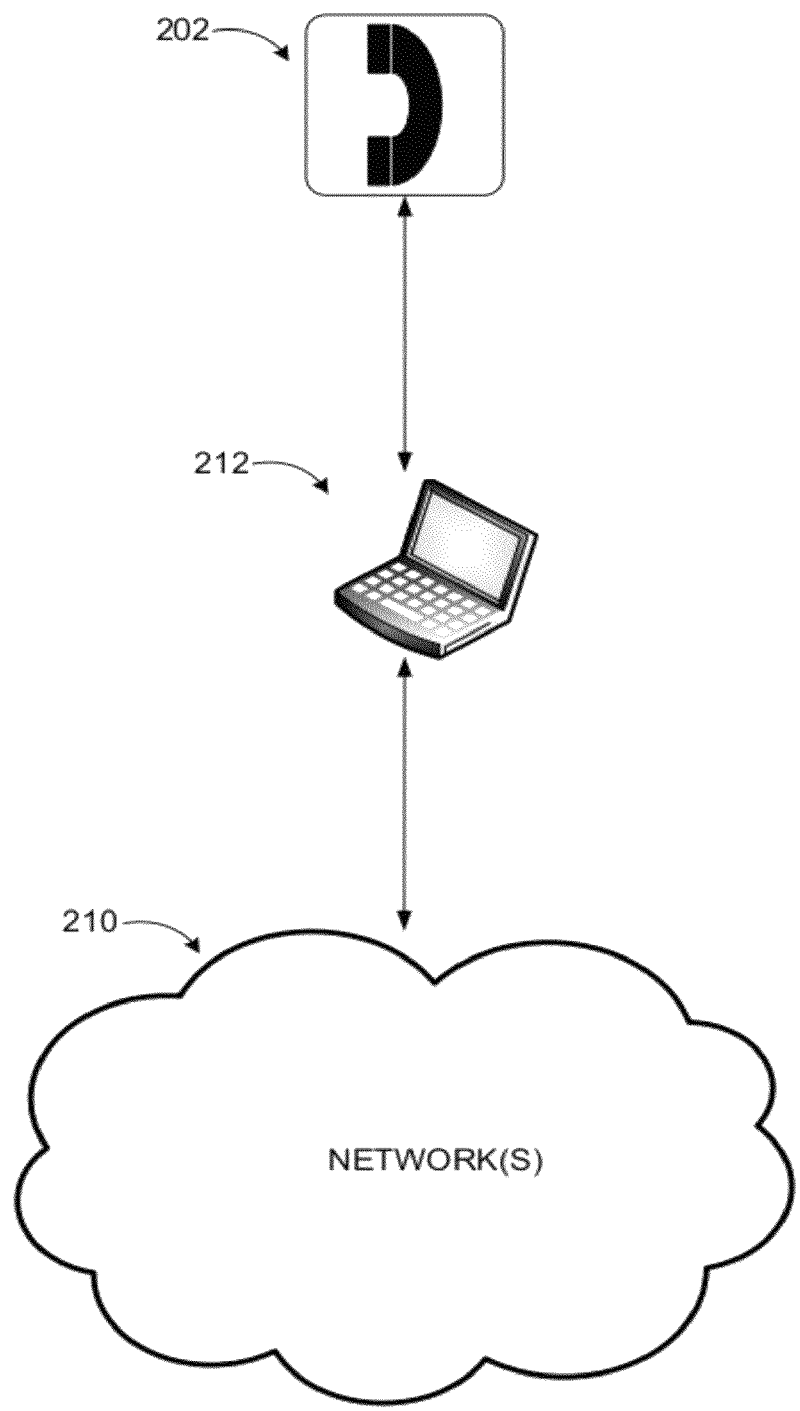
FIG. 2 illustrates an example basic system where a communication peripheral communicates with a communication application executed on a computing device to facilitate communication through enhanced communication networks.

FIG. 2 illustrates an example basic system where a communication peripheral communicates with a communication application executed on a computing device to facilitate communication through enhanced communication networks. The communication application may be executed on a stationary or mobile computing device (212) and enable a user to communicate employing various modalities such as voice, video, instant message, data sharing, desktop sharing, and similar ones. The communication application may be a distinct application installed and executed on computing device 212 or part of a hosted service provided through network(s) 210 and accessed by the user through computing device 212. For example, the communication application may be Microsoft Office Communicator® provided by MICROSOFT CORP. of Redmond, Wash.

Communication peripheral 202 may be any auxiliary device for facilitating single or multi modal communications between users. While examples herein refer to voice communication systems and peripherals, a peripheral according to embodiments may be any auxiliary device capable of facilitating voice communications, video communications, and other communication modes that may be provided in an enhanced communication system such as a UC system. Peripheral 202 may be coupled to computing device 212 through Universal Serial Bus (USB), Wireless Universal Serial Bus (WUSB), Bluetooth, Infra Red (IR), and other protocols (e.g. Human Interface Device (HID) protocol). The communication peripheral 202 may include an audio only phone, an audio/video communication device, a handheld terminal capable of facilitating voice and text communications, and comparable ones. As such, communication peripheral 202 may include hard (physical) controls (e.g. buttons, switches, etc.) and/or soft controls (soft buttons provided on a user interface). Some of the controls for the peripheral may also be provided on a user interface of the communication application executed on the computing device 212.

Network(s) 210 may include a number of sub-networks or be coupled to other networks forming the enhanced communication system as discussed in conjunction with FIG. 1. Network(s) 210 may comprise any topology of servers, clients, Internet service providers, and communication media. A system according to embodiments may have a static or dynamic topology. Network(s) 210 may include a secure network such as an enterprise network, an unsecure network such as a wireless open network, or the Internet. Network(s) 210 may also coordinate communication over other networks such as PSTN or cellular networks. Network(s) 210 provides communication between the nodes described herein. By way of example, and not limitation, network(s) 210 may include wireless media such as acoustic, RF, infrared and other wireless media.

While the example systems in FIGS. 1 and 2 have been described with specific components, embodiments are not limited to these components or system configurations and can be implemented with other system configuration employing fewer or additional components. Functionality of the systems enabling dynamic configuration of controls for communication peripherals may also be distributed among the components of the systems differently depending on component capabilities and system configurations.

Figure 3:
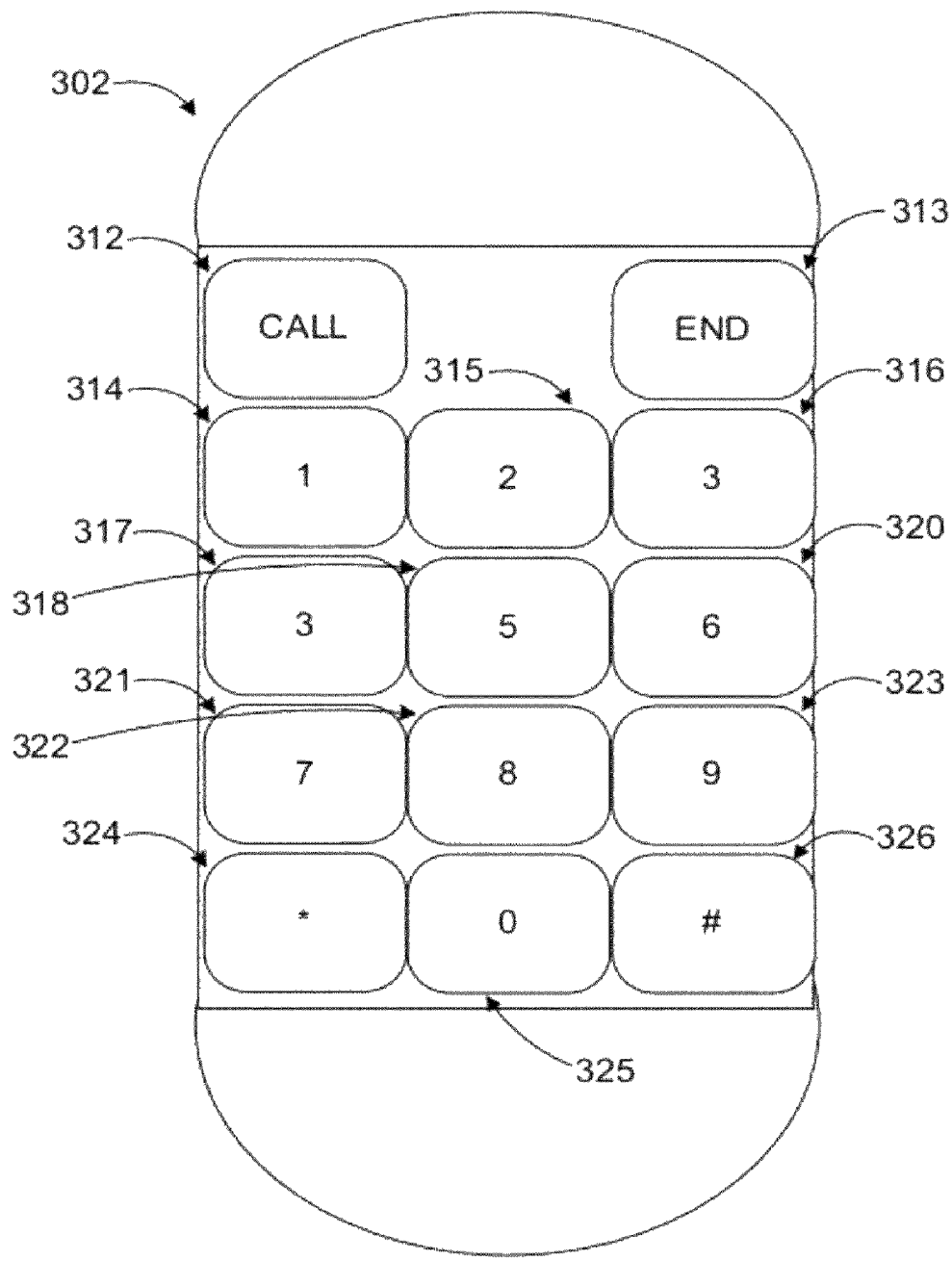
FIG. 3 illustrates an example communication peripheral displaying default controls prior to a call.

FIG. 3 illustrates an example communication peripheral displaying default controls prior to a call. Default controls of the peripheral 302 may be displayed on soft buttons that may be reconfigured based on call context. The default controls may include a soft button CALL 312 to start the call and a soft button END 313 to end the call. The default controls may further include soft buttons 314 through 326 for facilitating phone number dialing to reach other users/devices. Some or all of these controls may be soft controls or a combination of hard controls (physical buttons) and soft controls. While the example peripheral device 302 is shown with typical controls for a voice communication device, embodiments may be implemented as peripheral devices facilitating other forms of communication. Such peripherals may include controls for initiating and facilitating video communications, instant messaging, data/application sharing, and comparable ones.

In an example operation, the peripheral device 302 may advertise its capabilities to the communication application upon activation or connection. The communication application may then send context specific call commands. In the case of a default idle screen when no call is active, these may include commands for displaying the controls shown in FIG. 3 (or in some cases, those in FIG. 4). The peripheral may display the text provided by communication application on its user interface for the soft buttons. When the communication application receives an incoming call, it may send the incoming call alert to the peripheral, followed by context specific call commands. Examples of such commands and associated soft buttons are discussed in more detail in conjunction with FIG. 5. Peripheral 302 may display text associated with those commands on its user interface enabling a user to select among available options (e.g. answering the call, forwarding the call to voicemail, and the like). The peripheral may send the custom command to the communication application. It should be noted that the peripheral does not need to understand the command. Once the call is established, the communication application may send additional context specific call commands to the peripheral. In the case of an active call, these may include soft controls like "Hold", "End Call", and similar ones. In response to the user making a selection among the available controls during the call, the peripheral may again send the custom command to communication application without a need to understand that command.

The commands prior to, during, and after a call may be customized by the communication application based on context of the call (calling or called party's identification, whether or not the call includes particular types of networks, user preferences, network capabilities, computing device capabilities, or even peripheral capabilities). For example, organizational rules may prohibit forwarding of calls from outside an organizational network to others within the organizational network. In that case, the communication application may activate or deactivate "Forward" button based on whether or not the caller is an outside caller or not. According to another example, certain communication modes may be allowed based on network capabilities or the caller's identification. Soft buttons associated with those modalities may be activated based on the network capabilities at the time of the call or the caller's identification.

Figure 4:
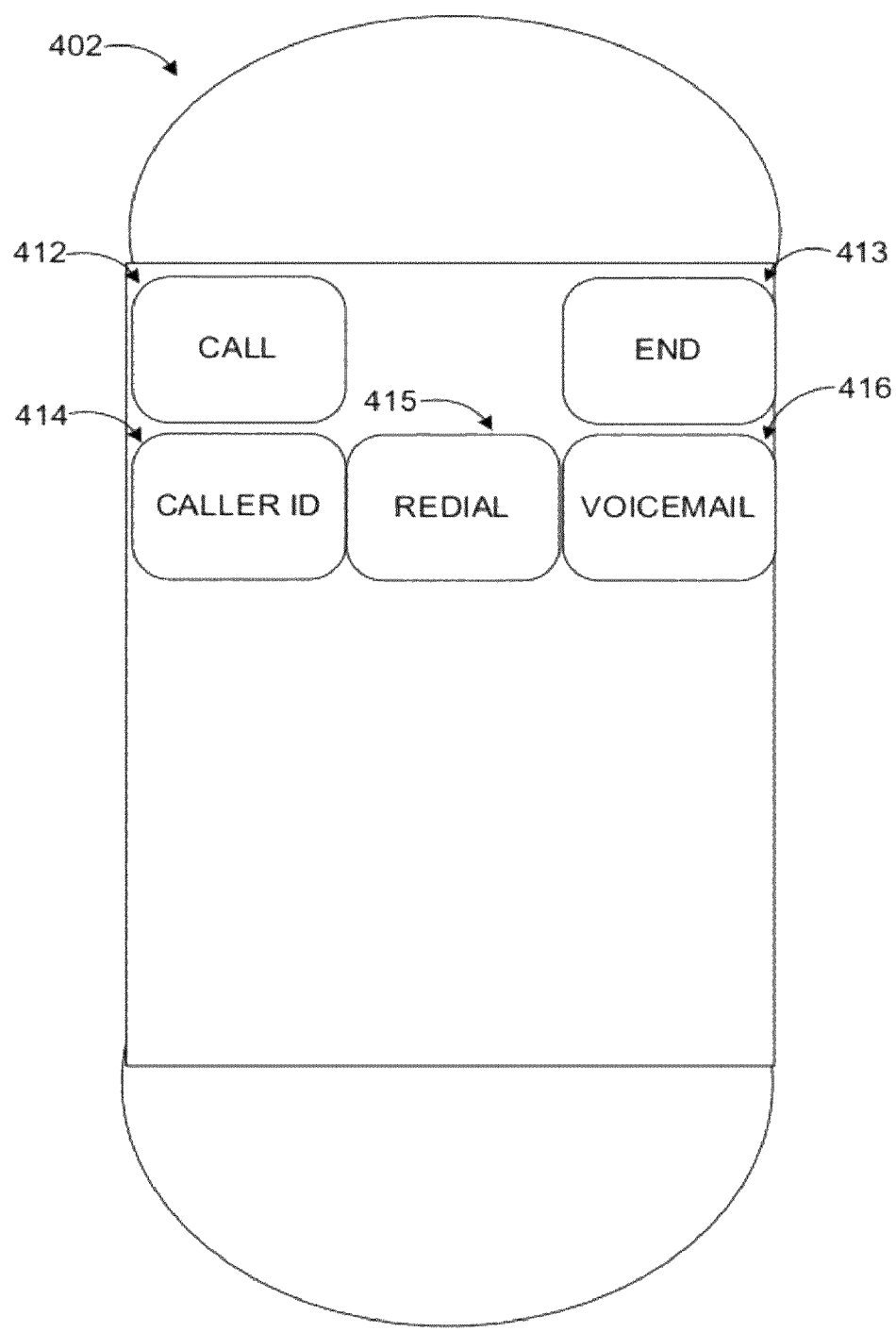
FIG. 4 illustrates the example communication peripheral of FIG. 3 displaying call context specific functionality following completion of a call.

FIG. 4 illustrates the example communication peripheral of FIG. 3 displaying call context specific functionality following completion of a call. As mentioned above, soft controls of a peripheral may be customized by the communication application associated with the peripheral. The user interface of the example peripheral device 402 shows standard call initiation and termination buttons 412 and 413. Immediately upon completion of a call, a user may desire to call back the last caller, get their caller identification, or check their voicemail (e.g. if another call came in during the last call and the user was unable to answer). Thus, these controls may be provided as buttons 414 through 416 on the user interface of peripheral 402.

According to another embodiment, the displayed user interface controls may be displayed temporarily for a predefined period upon completion of a call (e.g. 30 seconds) and the user interface restored to the standard pre-call user interface such as the one shown in FIG. 3. Of course, other controls, especially those associated with additional capabilities and features, may also be displayed on the peripheral device 402.

Figure 5:
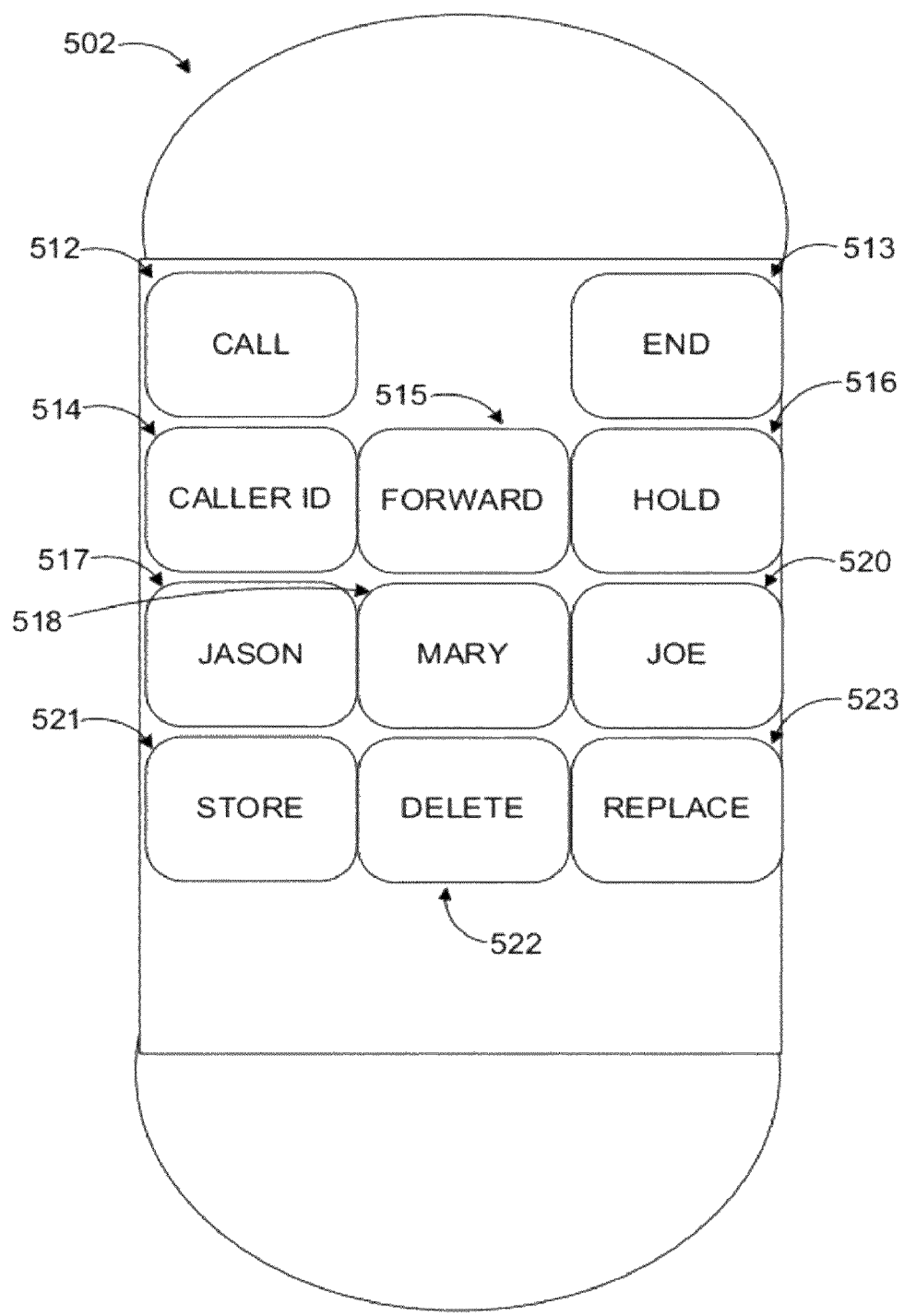
FIG. 5 illustrates the example communication peripheral of FIG. 3 displaying call context specific functionality during a call.

FIG. 5 illustrates the example communication peripheral of FIG. 3 displaying call context specific functionality during a call. As mentioned above, soft controls on a peripheral may be customized also during a call. Depending on the features provided by the communication application, the caller's (or the callee's) capabilities, and other aspects of the call (type of communication, permissions, network capabilities, and similar ones), different controls may be displayed to the user on the peripheral user interface.

The example user interface of peripheral device 502 include call initiation and termination controls 512 and 513 in addition to caller identification button 514, call forwarding button 515, call hold button 516. Other controls may include names of contacts (517, 518, 520) that upon selection may bring the called contacts into a conference call, a store button 521 for storing the other caller's contact information, a delete soft button 522 for removing the other caller's contact information from current contacts list, and a replace soft button 523 to replace the other caller's caller information with current information on the contacts list. Other soft buttons may also be added based on additional features and capabilities, as well as user preferences.

In other embodiments, the communication peripheral may display the call context specific controls showing soft buttons that adjust the volume of the call, perform noise cancellation to improve quality of the conversation in high noise environments, and comparable ones. In further embodiments, the communication peripheral may display fewer soft buttons during the call than displayed prior to the call in the default controls.

Figure 6:
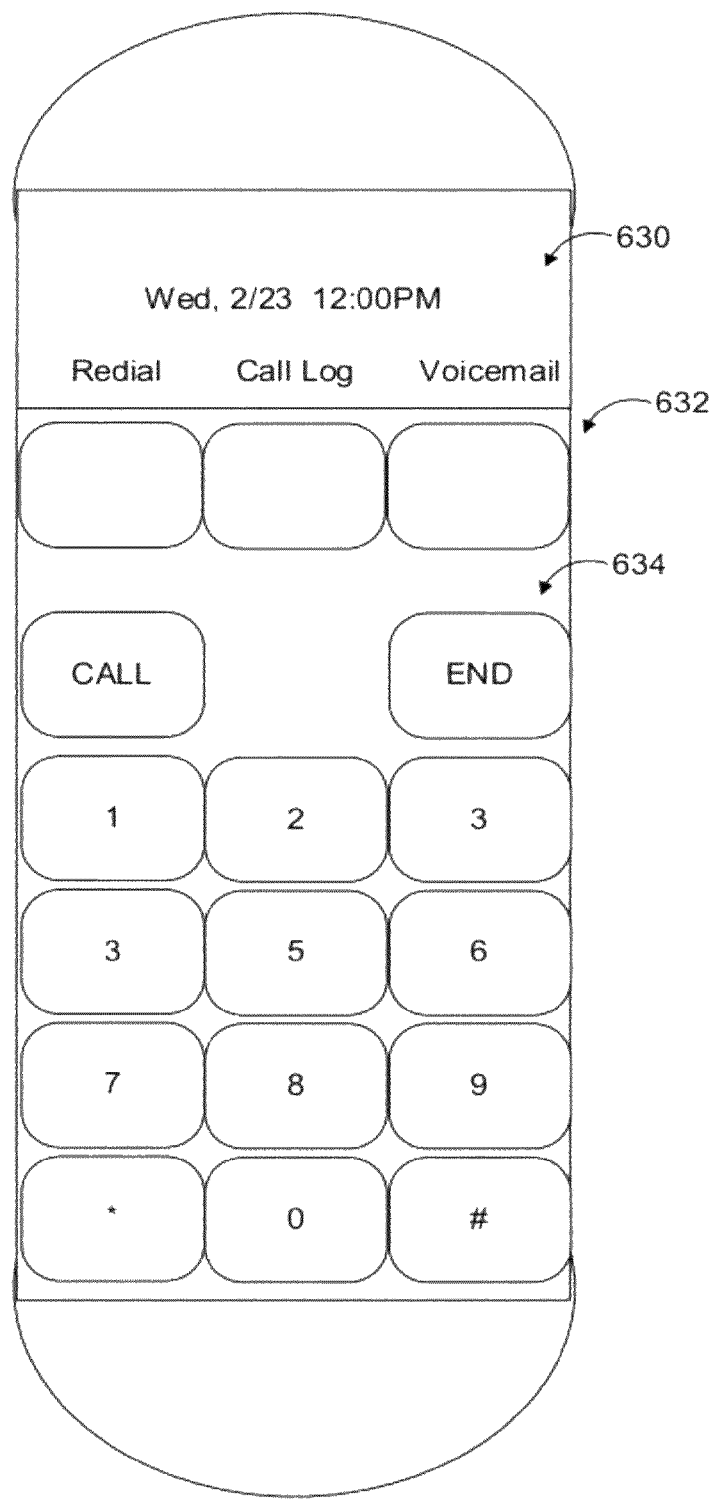
FIG. 6 illustrates another example communication peripheral displaying default controls during idle conditions.
Figure 7:
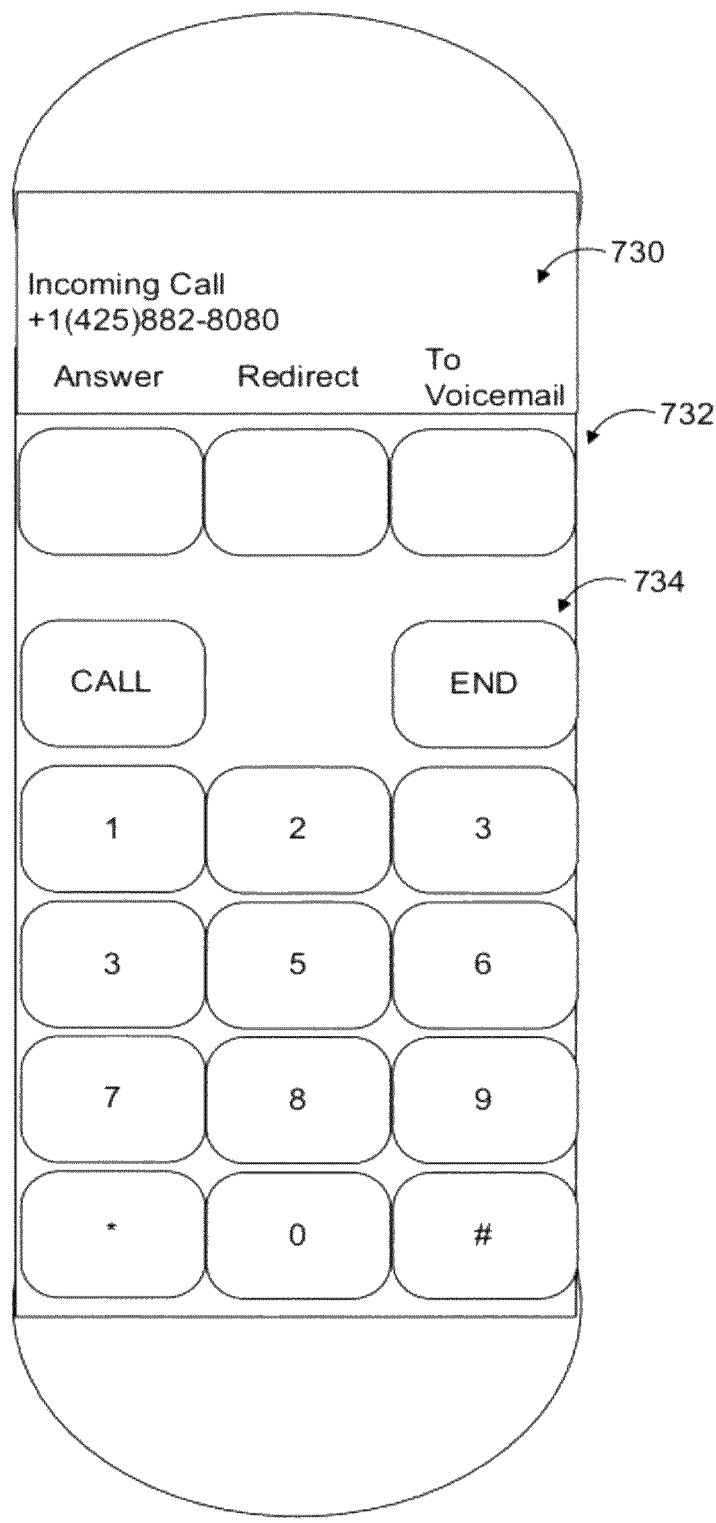
FIG. 7 illustrates the example communication peripheral of FIG. 6 displaying call context specific functionality upon receiving a call.
Figure 8:
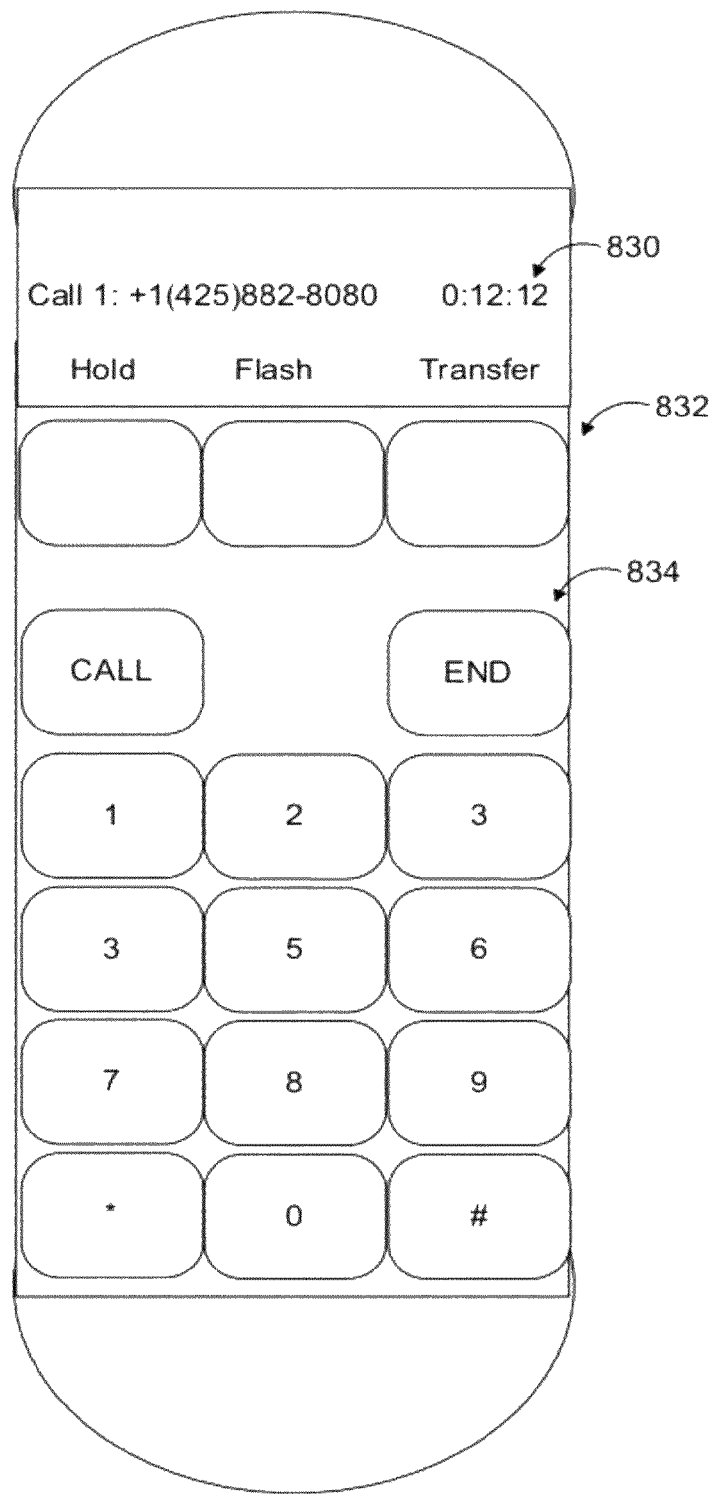
FIG. 8 illustrates the example communication peripheral of FIG. 6 displaying call context specific functionality during a call.

FIGS. 6 through 8 illustrate another example communication peripheral displaying default controls during idle conditions, upon receiving a call, and during a call. In FIG. 6, standard phone-related buttons 634 may be dedicated buttons. Soft buttons 632 are assigned functionality according to the current status of the communication application (idle) such as "Redial", "Call Log", and "Voicemail". The display 630 of the peripheral device shows a date and time.

In FIG. 7, the status of the communication application (and thereby the peripheral device) is changed. The application has received a call request and informed the peripheral device. The incoming call (along with its caller ID) is shown on the device's display 730 and soft buttons 732 are assigned new functionality based on the context. For example, the choices provided by the soft buttons are now "Answer", "Redirect", and "To Voicemail". Dedicated buttons 734 remain the same.

In FIG. 8, the status of the communication application (and thereby the peripheral device) is changed again. In this example, a call is in progress. The caller's number as well as call time is shown on the device's display 830 and soft buttons 832 are assigned new functionality based on the context. For example, the choices provided by the soft buttons are now "Hold", "Flash", and "Transfer". Dedicated buttons 834 remain the same.

The user interface elements, operations, and scenarios, as well as components of a unified communication system supporting dynamic configuration of controls for peripherals, described in FIG. 3-8 are exemplary for illustration purposes. A unified communication system and its components according to embodiments may be implemented using additional or fewer components and other schemes using the principles described herein.

Figure 9:
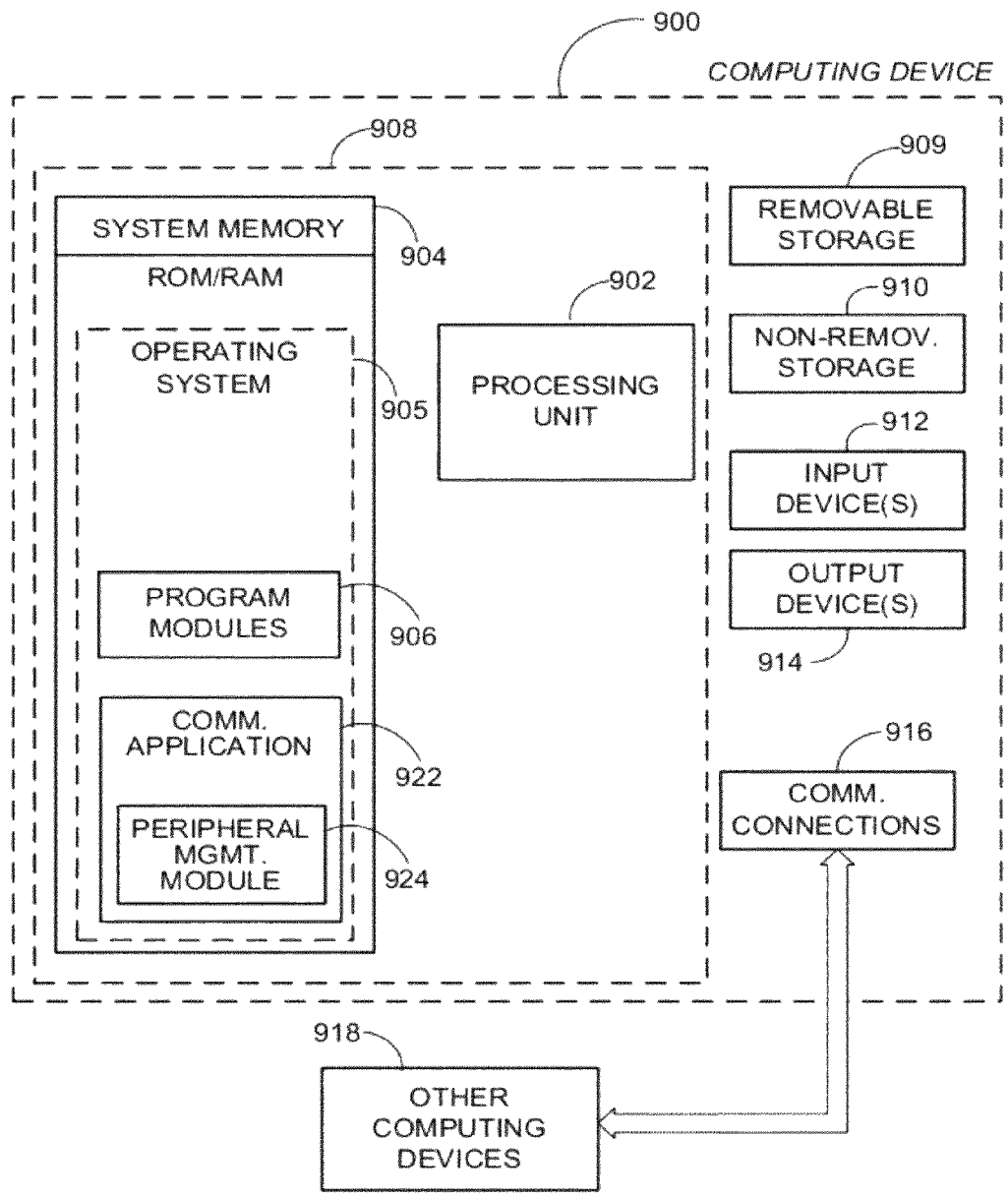
FIG. 9 is a block diagram of an example computing operating environment, where embodiments may be implemented.

FIG. 9 and the associated discussion are intended to provide a brief, general description of a suitable computing environment in which embodiments may be implemented. With reference to FIG. 9, a block diagram of an example computing operating environment is illustrated, such as computing device 900. In a basic configuration, the computing device 900 may be a client device executing a communication application in an enhanced communication system where call context specific controls may be dynamically configured/reconfigured on a connected peripheral. Computing device 900 may typically include at least one processing unit 902 and system memory 904. Computing device 900 may also include a plurality of processing units that cooperate in executing programs. Depending on the exact configuration and type of computing device, the system memory 904 may be volatile (such as RAM), non-volatile (such as ROM, flash memory, etc.) or some combination of the two. System memory 904 typically includes an operating system 905 suitable for controlling the operation of the computing device, such as the WINDOWS® operating systems from MICROSOFT CORPORATION of Redmond, Wash. The system memory 904 may also include one or more software applications such as program modules 906, communication application 922, and peripheral management module 924.

Communication application 922 and peripheral management module 924 may be separate applications or integral modules of a hosted service application that provide advanced communication services through computing device 900. Moreover, the functions performed by peripheral management module 924 such as determining available features based on call context and dynamically configuring or reconfiguring peripheral device user interface may be provided directly by the communication application 922. This basic configuration is illustrated in FIG. 9 by those components within dashed line 908.

The computing device 900 may have additional features or functionality. For example, the computing device 900 may also include additional data storage devices (removable and/or non-removable) such as, for example, magnetic disks, optical disks, or tape. Such additional storage is illustrated in FIG. 9 by removable storage 909 and non-removable storage 910. Computer storage media may include volatile and non-volatile, removable and non-removable media implemented in any method or technology for storage of information, such as computer readable instructions, data structures, program modules, or other data. System memory 904, removable storage 909 and non-removable storage 910 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of device 900. Computing device 900 may also have input device(s) 912 such as keyboard, mouse, pen, voice input device, touch input device, etc. Output device(s) 914 such as a display, speakers, printer, etc. may also be included. These devices are well known in the art and need not be discussed at length here.

The computing device 900 may also contain communication connections 916 that allow the device to communicate with other computing devices 918, such as over a wireless network in a distributed computing environment, for example, an intranet or the Internet. Other computing devices 918 may include client devices and servers of a UC network as discussed above. Communication connection 916 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 10:
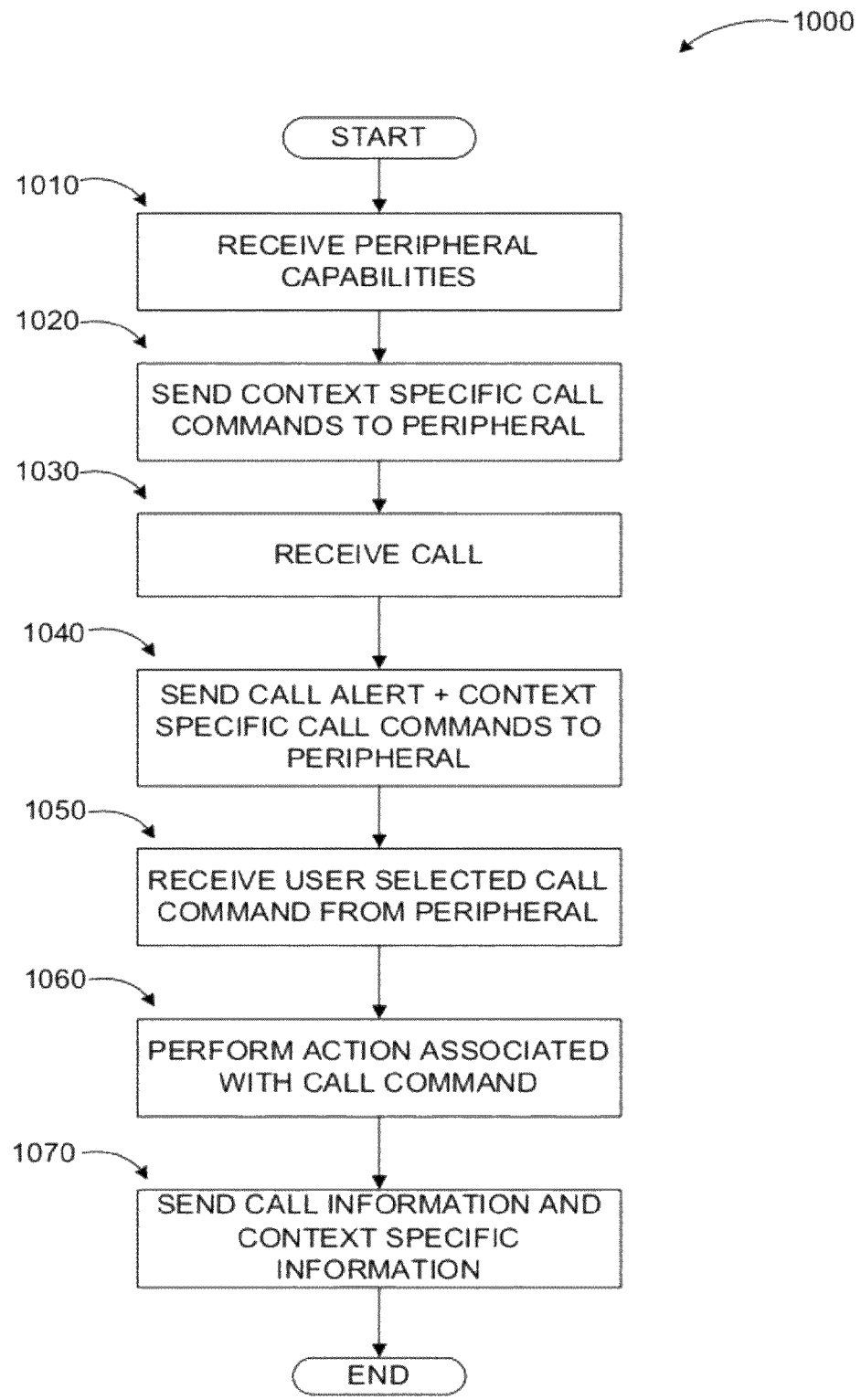
FIG. 10 illustrates a logic flow diagram for a process of using call context specific controls and enabling a peripheral to display the call context specific controls on the communication peripheral.

FIG. 10 illustrates a logic flow diagram for process 1000 of using call context specific controls and enabling a peripheral to display the call context specific controls on the communication peripheral. Process 1000 may be implemented by a communication application connected to a communication peripheral as discussed previously.

Process 1000 begins at operation 1010, where the communication application receives capabilities of the communication peripheral upon connection to the peripheral or activation of either one. The peripheral may advertise its capabilities to the communication application or the application may query available peripheral devices. The communication may be accomplished through a standardized protocol such as HID. The capabilities may include number of available soft buttons on the communication peripheral that may be reconfigured. Other capabilities may include type of graphic and text that the soft buttons may display including, but not limited to, font characteristics and number of characters that may be displayed on the soft buttons.

At operation 1020, context specific call commands are sent to the peripheral for customized display of call associated user interface elements. The elements may include customized standard elements or elements associated with specific features that may be provided by the communication application. According to some embodiments, the peripheral device does not need to understand these commands. It simply displays them to the user and notifies the communication application when the user selects the command such that the communication application can perform actions associated with the particular context specific command.

At operation 1030, the communication application receives a call. The application notifies the peripheral about the received call and follows up with additional call context specific commands at operation 1040. Example commands for this pre-call stage may include features like redirecting the call, forwarding the call to a particular voicemail (which may be different depending on who the caller is), and similar context specific commands.

At operation 1050, the communication application receives an indication of a user selection of one of the context specific commands from the peripheral. As indicated above, the peripheral does not need to understand the command; it simply forwards the user selection to the communication application. This is followed by operation 1060, where the communication application performs one or more actions associated with the user selected context specific command. At subsequent operation 1070, the communication application sends call information and context specific information to the peripheral (for example, if any controls need to be added or modified during the call).

The operations included in process 1000 are for illustration purposes. Dynamically configuring and/or reconfiguring controls of a peripheral device may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part on a computing device for managing a communication peripheral device in an enhanced communication system, the method comprising:
receiving capability information, including a number of available configurable soft control elements, from the peripheral device;
automatically determining a call context specific command based on the capability information of the peripheral device;
providing the call context specific command to the peripheral device to enable display of a custom control on the soft control elements on the peripheral device's user interface, wherein the custom control is related to an incoming call, an active call, a completed call, and an idle status of the peripheral device;
receiving a user action for selecting at least one of the soft control elements for executing the custom control displayed on the selected soft control element;
automatically determining call context specific information about the received user action;
sending another call context specific command to the peripheral device to enable display of another custom control related to an incoming call, an active call, a completed call, and an idle status of the peripheral device on the soft control elements on the peripheral device's user interface; and
upon receiving an indication of a user selection of the other custom control from the peripheral device, performing an operation associated with the other custom control.

2. The method of claim 1, further comprising:
receiving a call through a network connection;
determining call context specific information about the received call;
sending another call context specific command to the peripheral device to enable display of another custom control on the peripheral device's user interface; and
upon receiving an indication of a user acceptance of the received call from the peripheral device, facilitating the call through the peripheral device.

3. The method of claim 2, further comprising:
determining additional context specific information about the call while the call is in progress;
sending a further call context specific command to the peripheral device to enable display of a further custom control on the peripheral device's user interface during the call; and
sending yet another call context specific command to the peripheral device to enable display of yet another custom control on the peripheral device's user interface upon completion of the call.

4. The method of claim 3, wherein the yet another custom control is displayed on the peripheral device's user interface for a predefined period and the user interface restored to a pre-call status upon expiration of the predefined period.

5. The method of claim 1, wherein receiving capability information from the peripheral device includes enabling the peripheral device to advertise its capabilities upon one of: connection to the computing device and activation of the peripheral device.

6. The method of claim 1, wherein the call context specific command is determined based on at least one from a set of: a call type, a calling party identification, a computing device capability, a peripheral capability, a network capability, and a user preference.

7. The method of claim 1, wherein the peripheral device is enabled to transmit a user selection of a displayed custom control to the computing device without being able to interpret an associated call context specific command received from the computing device.

8. The method of claim 1, wherein the user action includes initiating a call.

9. A computing device for facilitating communications in a Unified Communication (UC) system, the computing device comprising:
   a memory;
   a processor coupled to the memory, the processor capable of executing instructions stored in the memory associated with a communication application, the communication application configured to:
     receive capability information, including a number of available configurable soft control elements, advertised by a peripheral device;
     automatically determine call context specific information associated with a call upon receiving a request to initiate the call from a user, receiving the call from another user, while the call is in progress, and upon completion of the call based on at least one from a set of: a call type, a calling party identification, a computing device capability, a peripheral capability, a network capability, and a user preference;
     automatically provide call context specific commands to the peripheral device to enable display of custom controls on the soft control elements on the peripheral device's user interface depending on whether the peripheral device is in an idle state and whether the call has been received, is in progress, and is completed;
     upon receiving an indication of a user selection of one of the custom controls displayed on the peripheral device's user interface, perform an action associated with the custom control.

10. The computing device of claim 9, wherein the communication application is configured to facilitate a multi-modal communication session comprising at least one from a set of: voice communication, video communication, instant messaging, data sharing, application sharing, and desktop sharing.

11. The computing device of claim 9, wherein the communication application is configured to communicate with the peripheral device through one of: Universal Serial Bus (USB) connection, Wireless USB (WUSB) connection, Bluetooth connection, and infrared connection.

12. The computing device of claim 9, wherein the peripheral device includes at least one physical control element and a plurality of soft control elements displayed on its user interface for displaying the custom controls.

13. The computing device of claim 12, wherein the call context specific command includes information associated with at least one from a set of: a type of graphic and text, font characteristics, and a number of characters to be displayed on the soft control elements.

14. The computing device of claim 9, wherein the computing device is one of a mobile computing device and a stationary computing device coupled to the UC system through one of a wired medium and a wireless medium.

* * * * *